(12) United States Patent
Plotka

(10) Patent No.: US 10,987,203 B2
(45) Date of Patent: Apr. 27, 2021

(54) MULTIPLE MODE DENTAL DEVICE

(71) Applicant: Mouth Watchers, LLC, Beverly, MA (US)

(72) Inventor: Ronald Taylor Plotka, Marblehead, MA (US)

(73) Assignee: MOUTH WATCHERS, LLC, Beverly, MA (US)

( * ) Notice: Subject to any disclaimer, the term of this patent is extended or adjusted under 35 U.S.C. 154(b) by 52 days.

(21) Appl. No.: 16/123,890

(22) Filed: Sep. 6, 2018

(65) Prior Publication Data
US 2020/0078151 A1 Mar. 12, 2020

(51) Int. Cl.
*A61C 17/34* (2006.01)
*A61C 17/22* (2006.01)
*A46B 5/00* (2006.01)
*A46B 9/04* (2006.01)

(52) U.S. Cl.
CPC .............. *A61C 17/34* (2013.01); *A46B 5/002* (2013.01); *A61C 17/222* (2013.01); *A46B 9/04* (2013.01); *A46B 2200/1066* (2013.01)

(58) Field of Classification Search
CPC ..... A61C 17/34; A61C 17/222; A61C 17/349; A61C 17/3436; A61C 17/22; A46B 5/002; A46B 9/04; A46B 2200/1066; A46B 5/0091
See application file for complete search history.

(56) References Cited

U.S. PATENT DOCUMENTS

| | | | | |
|---|---|---|---|---|
| 6,247,477 B1 * | 6/2001 | Wagner | ................ | A45D 44/18 |
| | | | | 132/309 |
| 7,316,044 B1 * | 1/2008 | Nguyen | ................ | A61C 17/26 |
| | | | | 15/23 |
| 9,198,505 B1 | 12/2015 | Brar | | |
| 2001/0054211 A1 | 12/2001 | Carbedo-Deslierres | | |
| 2004/0040571 A1 * | 3/2004 | Williams, Sr. | ..... | A46B 15/0071 |
| | | | | 132/309 |
| 2004/0187887 A1 * | 9/2004 | Beckman | ........... | A46B 15/0069 |
| | | | | 132/309 |
| 2008/0313830 A1 | 12/2008 | Gatzemeyer et al. | | |
| 2010/0024143 A1 * | 2/2010 | Dickie | ............... | A46B 15/0087 |
| | | | | 15/167.1 |
| 2010/0071142 A1 * | 3/2010 | Boll | ..................... | A61C 17/221 |
| | | | | 15/22.1 |

(Continued)

OTHER PUBLICATIONS

Power Pikster Interdental Brush [online]. Piksters 2018 [retrieved on Dec. 28, 2018]. Retrieved from the Internet: <URL: https://www.amazon.com/Power-Pikster-interdental-cleaning-Interdental/dp/B072MKKDR2ref=asc_df_B072MKKDR2/?tag=hyprod-20&linkCode=df0&hvadid=312157500876&hvpos=1o1&hvnetw=g&hvrand=13015542815884631604&hvpone=&hvptwo=&hvqmt=&hvdev=c&hvdvcmdl=&hvlocint=&hvlocphy=9001923&hvtargid=pla-569237456603&psc=1>.

(Continued)

*Primary Examiner* — Robert J Scruggs
(74) *Attorney, Agent, or Firm* — White-Welker & Welker, LLC; Matthew T. Welker, Esq.

(57) ABSTRACT

A powered brush has two different brushes for different purposes that are selectively vibrated for powered cleaning. The brushes may be a tooth brush and an interdental brush that are separately operated at different frequencies. One or more buttons or switches provide control signals to the powered brush to selectively actuate the different brushes. A controller connects a motor to a power source such as a battery based on the control signals. The controller may include a timer for actuating the selected brush for a given time period.

15 Claims, 2 Drawing Sheets

(56) References Cited

U.S. PATENT DOCUMENTS

2010/0330538 A1    12/2010  Salazar
2011/0041269 A1*    2/2011  Iwahori ............... A61C 17/221
                                                        15/22.1
2011/0081629 A1     4/2011  Hegemann et al.
2016/0143718 A1*    5/2016  Serval ............... A46B 15/0008
                                                        15/22.1

OTHER PUBLICATIONS

Waterpik Cordless Plus Water Flosser, Model WP 450 [online]. water pik, inc. 2018 [retrieved on Dec. 28, 2018]. Retrieved from the Internet: <URL: https://www.walgreens.com/store/c/waterpik-cordless-plus-water-flosser-model-wp-450/ID=prod3460578-product?ext=gooKBM_PLA_-.
PCT International Search Report for PCT Application No. PCT/US2019/049926 dated Dec. 27, 2019 (4 pages).
PCT Written Opinion for PCT Application No. PCT/US2019/049926 dated Dec. 27, 2019 (5 pages).

* cited by examiner

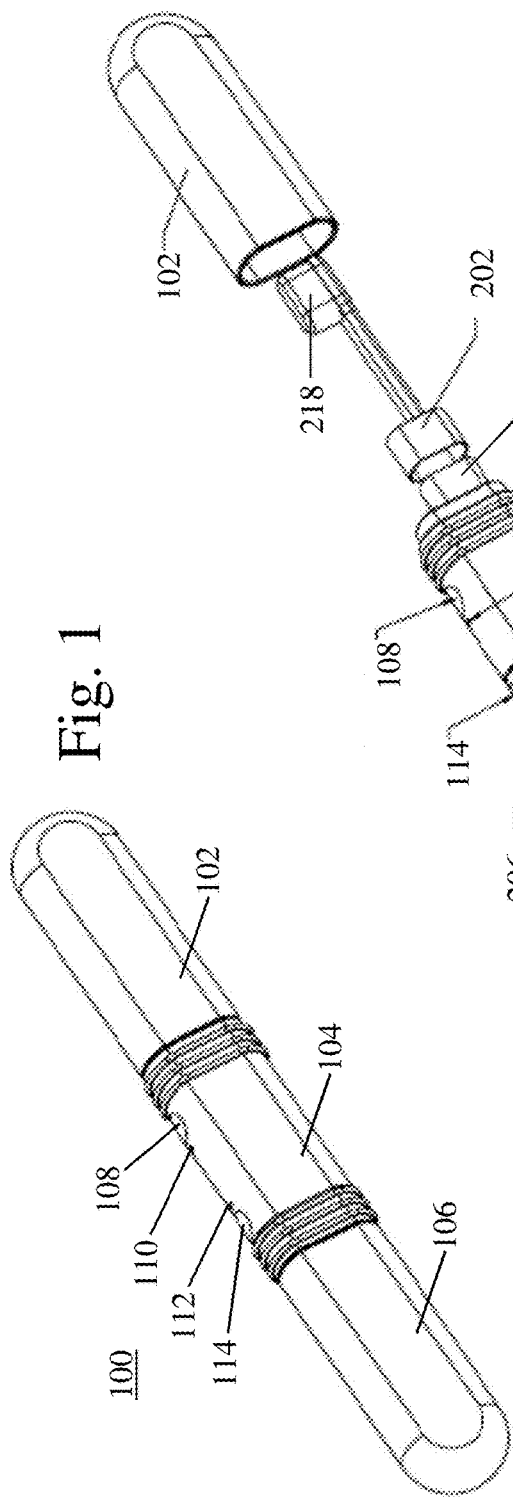

MULTIPLE MODE DENTAL DEVICE

STATEMENT REGARDING FEDERALLY SPONSORED RESEARCH OR DEVELOPMENT (Not Applicable)

BACKGROUND

Toothbrushes have been proposed for different types of efficacy in cleaning teeth. For example, some toothbrushes are designed to improve cleaning near a gum line, while other designs are intended to improve cleaning over uneven surfaces, such as the tops of molars. Some toothbrush designs are intended for improved cleaning around dental implants or orthodontics.

SUMMARY

Discussed herein are techniques and implementations for a toothbrush that provides multiple brushes in one assembly. The following is a discussion of example implementations and techniques. The examples and features in the examples are not required in combination, and can be implemented individually or in one or more combinations and are discussed here as separate example implementations.

Each of the brushes is actuated with a single motor for both brushes or separate motors, each dedicated to a single brush. A selector switch selects a brush/motor for actuation. An actuation switch turns the motor or selected motor on or off. The actuation of a brush with the motor causes the brush to oscillate or vibrate. The vibration of one brush is at a same or at a different frequency as another brush. The frequency of vibration may be modulated during brushing. As used herein, vibration or vibrational movement includes oscillation or oscillatory motion, although the terms may be used interchangeably at times. One or more of the brushes are each actuated by a different motor, or more than one brush is actuated by one motor. A timer is employed to separately enable one or more of the brushes to be actuated for a period of time. The motor is powered by one or more batteries which can be disposable or rechargeable.

At least one of the brushes is an interdental brush. At least one of the brushes is a regular toothbrush. One or more covers are provided for the toothbrush. One or more indicator lights are provided on the toothbrush casing. A battery cover is provided on the toothbrush casing. A portion of the casing serves as a handle that the user can grasp to use the toothbrush. The casing may also contain a storage space for extra brush heads or interdental brushes.

A powered toothbrush is provided with a normal toothbrush on one end and an interdental toothbrush on another end. The two toothbrushes are actuated by a single DC motor that causes the toothbrushes to vibrate or oscillate. The motor is powered by battery power, which may be implemented as one or more AA or AAA batteries. The normal toothbrush is connected to one end of the motor and actuated at a high vibratory frequency. The high vibratory frequency may be efficacious for thorough cleaning of teeth. The interdental toothbrush is connected to another end of the motor and is actuated at a low vibratory frequency. The low vibratory frequency may be efficacious to clean around gum tissue with greater sensitivity and/or to provide a massaging action to the gum tissue. A switch is provided to permit the motor actuation to be switched between the normal toothbrush and the interdental toothbrush. An On/Off switch is provided to switch power from the batteries to the motor.

Interdental toothbrushes are useful for cleaning around implants and orthodontic work (braces). Interdental toothbrushes have a smaller profile, can have a bristle pattern shape that is tubular, pointed, tapered or cone shaped on an end of a support substrate, for example. The bristles can be outwardly pointed on the surface of a contoured shape, such as a cylinder, tube or conic section, for example. Interdental toothbrushes can more easily reach into areas that are less easily reached by regular toothbrushes. Interdental toothbrushes can clean in smaller, somewhat occluded or obstructed areas around teeth, including cleaning in and around braces. Normal toothbrushes are useful for cleaning larger unobstructed tooth surfaces and gums. These regular or normal toothbrushes may have bristles arranged in a rectangular pattern on one side and end of a toothbrush support substrate. The bristles may be of same or different lengths. Powered toothbrushes can improve the cleaning process for interdental and normal toothbrushes by causing the support substrate to vibrate, which can transfer a brushing action to the bristles. A vibrating interdental brush can also massage the gums leading to improved blood circulation and thus healthier gums.

A battery powered oral care instrument includes a powered normal toothbrush at one end of the device and a powered interdental toothbrush as the other end. Both ends can share the same motor and battery system, and they can each have their own switch or a common switch for activation. Switches can be provided so that the normal toothbrush end has more vigorous vibration than the interdental toothbrush end and the user is not required to use different cleaning appliances during the same cleaning session, which can be less convenient. The normal toothbrush end can be used for cleaning teeth and can apply more vigorous vibration to the tooth area than the interdental toothbrush end, which can be used for cleaning at the gums and is gentler on the gums. The normal toothbrush can provide more vigorous vibration to clean the tooth surface and enamel, which is much harder than, for example, the gums or gum tissue. The less vigorous or gentler cleaning provided by the interdental brush is useful for cleaning the gums or gum tissue, which is much softer than the tooth surfaces and enamel.

The power toothbrush has two powered ends, one with a vibrating power (normal) toothbrush and the other with a vibrating interdental brush. The power toothbrush uses the same battery to operate each of the two ends with different power settings. A button pressed by the user signals or connects the battery to power one end or the other. Each end can operate at a different speed/force/power level. The normal toothbrush side operates at a greater vibration/minute. The interdental side operates at a lesser vibration/minute. The vibration/minute for the normal toothbrush side is greater than the vibration/minute for the interdental side.

Soft interdental cleaning and stimulation may be advantageous for use with implants and more sophisticated crown and bridge dental work. Peri-implantitis can be reduced or eliminated by cleaning interdentally with a soft interproximal bristle brush. According to the FDA, vibration stimulation of the gums while cleaning with an interdental brush can increase blood circulation, which is healthy for the gums. In addition, vibration stimulation can contribute to reducing pain that might be experienced while brushing interdentally. A power interdental brush user may obtain a more effective interdental brushing because of the effects of vibration on cleaning, e.g., debris, plaque, etc. may be mechanically moved or dislodged, and because the vibrations enhance a massage action stimulation that can be healthy for gums and enjoyable to the user.

Some example implementations provide a power brush that includes a motor coupled to a power source for actuating the motor, a first brush coupled to the motor and a second brush coupled to the motor, with the first brush and the second brush being configured to separately vibrate based on selective actuation of the motor. The motor may be a dual-action motor, with separate actions for the first brush and for the second brush. The power source may be one or more batteries. The brushes may be a toothbrush and an interdental brush. The first brush may be configured to vibrate at a first frequency and the second brush may be configured to vibrate at a second frequency that is different from the first frequency.

In some example implementations, the power brush includes a circuit board disposed between the power source and the motor for controlling power supplied to the motor. A button can be coupled to the circuit board for actuating the first brush or the second brush. An indicator representing actuation of the first brush or the second brush can be provided on the power brush. The circuit board, motor and/or a link between the motor and the first brush or the second brush may be configured to cause the first brush to vibrate at a first frequency when actuated and cause the second brush to vibrate at a second frequency that is different from the first frequency when actuated. One or more operation profiles may be provided to the circuit board that can be selectively applied for operation of the first brush and the second brush with different parameters.

In some example implementations, a power toothbrush is provided that includes an electric motor coupled to an electric power source for actuating the motor, a first brush coupled to the motor and a second brush coupled to the motor. The power toothbrush may include a control circuit interposed between the power source and the motor for selectively actuating the first brush or the second brush by selectively connecting power to the motor. The motor may be implemented as a dual-action motor, with separate actions for the first brush and for the second brush. The motor may include a first end for driving the first brush and a second end for driving the second brush, where the motor is configured to separately operate the first end and the second end, such that the first end does not operate when the second end operates, and vice-versa. The first brush may be a toothbrush configured to vibrate at a first frequency and the second brush may be an interdental brush configured to vibrate at a second frequency that is different from the first frequency. A button may be coupled to the circuit board for actuating the first brush or the second brush. An indicator representing actuation of the first brush or the second brush may be provided to the circuit board. One or more of the circuit board, motor or a link between the motor and the first brush or the second brush may be configured to cause the first brush to vibrate at a first frequency when actuated and to cause the second brush to vibrate at a second frequency that is different from the first frequency when actuated. One or more operation profiles may be provided to the circuit board that can be selectively applied for operation of the first brush and the second brush with different parameters.

In some example implementations, a method for operating a toothbrush is provided that includes providing a brush selection signal to a brush system, where the brush system includes a motor coupled to a power source for actuating the motor, a first brush coupled to the motor and a second brush coupled to the motor. The brush selection signal results in a selected brush from among the first brush and the second brush. The method includes providing a brush actuation signal to the brush system to actuate the selected brush and actuating the selected brush to vibrate. The method may include controlling actuation of the selected brush with an electric circuit to vibrate the selected brush at a predetermined frequency based on the selected brush. The method may include actuating the selected brush to vibrate for a predetermined amount of time.

BRIEF DESCRIPTION OF THE SEVERAL VIEWS OF THE DRAWINGS

The disclosure is described in greater detail below, with reference to the accompanying drawings, in which:

FIG. 1 is an isometric view of an example enclosed power toothbrush and case;

FIG. 2 is an exploded isometric view of the power toothbrush of FIG. 1.

DETAILED DESCRIPTION

Figure 3:
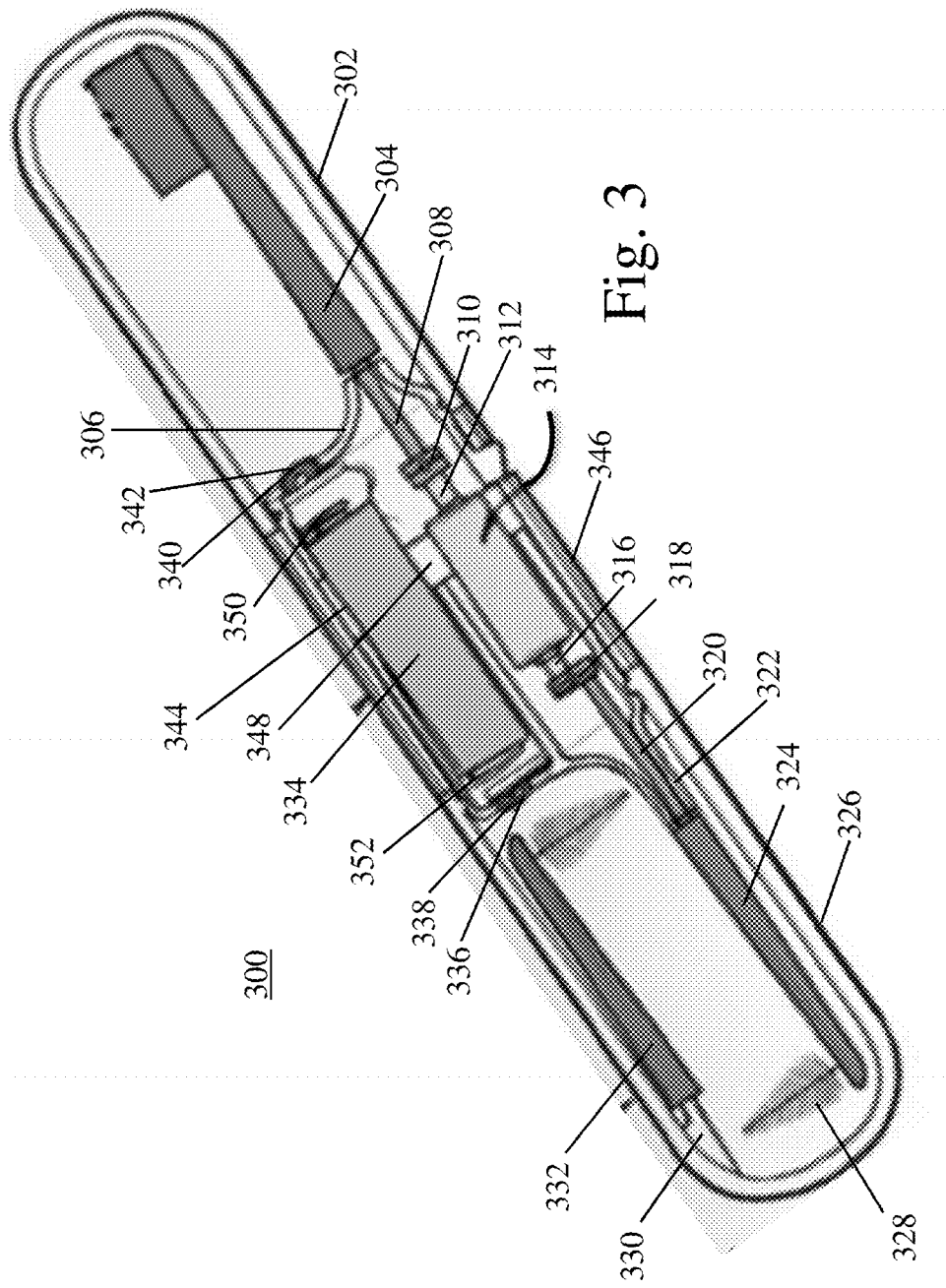
FIG. 3 is cross-sectional side view of an example enclosed power toothbrush and case.

Discussed herein is a dual functioning device dental care device that provides tooth brushing action at one end and interdental brushing at another end. In some example implementations, the toothbrush portion vibrates at a high frequency, which may or may not be a sonic frequency. The vibration may be considered to include oscillations or movements of the brush or bristles. In some example implementations, the vibrations are in a range of from about 200 Hz to about 20 kHz, inclusive, and more particularly in a range of from about 200 Hz to about 400 Hz, inclusively. In addition, or alternatively, the brush may be operated to produce oscillations in a range of from about 12,000 to about 24,000 oscillations per minute, inclusively, or to produce movements in a range of from about 24,000 to about 48,000 movements per minute, inclusively. These operating ranges may contribute to proper cleaning of teeth. The interdental portion vibrates, oscillates or moves at a lower frequency relative to the toothbrush portion, for example in a range of from about 20% to about 80%, inclusively, and more particularly in range of from about 40% to about 60%, inclusively, and more particularly at about 50% of the toothbrush vibrations, oscillations or movements. The lower operating range for the interdental portion may contribute to preventing, or completely prevent gum damage while cleaning away debris. These frequency/speed ranges should not be considered limiting, as other implementations may use lower or higher frequencies/speed, and/or may have broader or narrower ranges of operation. In some examples, the speed/frequency of the interdental portion is selected to avoid tearing or injury of gum tissue, and/or to avoid irritating gum tissue. The case for the device includes storage end caps, one that cover the interdental portion and one that covers the toothbrush portion. The end caps can be maintained on the device with detents over which the end caps snap to be retained in place. One or more end caps can serve as a housing for one or more additional toothbrush or interdental brush heads. Such additional brushes can be used as replacements for the respective toothbrush or interdental brush so that a fresh brush is available.

The interdental brush can be constructed with a twisted wire with a bristle pattern composed in the twisted wire. The wire may be coated with a sealing material. The wire may be coated with rubber. The wire may be reversed or wound back on itself to present a blunt profile to areas to be brushed. The wire may be configured to prevent it from scratching dental work, such as an implant base.

The battery power can be provided by replaceable batteries, such as one or more AA batteries. The battery power can be provided by rechargeable batteries that are not replaced or replaced after a significant number of uses and recharges. Such batteries can be recharged via inductive charging or direct charging from a DC source.

Referring to FIG. 1, an assembled case and power toothbrush 100 is illustrated. The case includes end caps 102 and 106 for covering the respective brush heads. End caps 102, 106 (brush covers) may be opaque or transparent. In an example implementation, end cap 102 is transparent and end cap 106 is opaque. End caps 102, 106 include detents that are configured to releasably snap onto and engage with cooperative structures on body case 104. Such detents contribute to retaining end caps 102, 106 on body case 104.

Toothbrush 100 includes indicators 110, 112 on body case 104. Indicators 110, 112 can provide indications on a status of the operation of the power toothbrush. For example, indicator 110 can indicate that the toothbrush portion associated with end cap 102 is powered, and indicator 112 can indicate that the toothbrush portion associated with end cap 106 is powered. Indicators 110, 112 can be composed of LEDs or other light sources that are connected to a circuit board internal to body case 104. Indicators 110, 112 can be composed of a transparent or translucent material that passes light from internal LEDs or other light sources. The light provided by each of indicators 110, 112 can be different colors, can be made to light, flash, change color, or any other presentation that can provide an indication of toothbrush status.

Buttons 108, 114 are located on body case 104 of toothbrush 100. Button 108 may actuate a toothbrush portion associated with end cap 102. Button 114 may actuate a toothbrush portion associated with end cap 106. Buttons 108, 114 may actuate a respective switch (not shown) within body case 104 that causes activation or deactivation of the associated brush. One or more of buttons 108, 114 may have a mechanical portion that latches the button in position to actuate a respective switch or brush. One or more of buttons 108, 114 may include a contact that closes a circuit upon actuation that activates or deactivates the respective brush. Buttons 108, 114 and indicators 110, 112 may be watertight with respect to body case 104, so that liquids cannot easily pass through to an inside of body case 104.

Referring now to FIG. 2, toothbrush 100 is shown in an exploded view to show internal components. A brush head 202 is configured to be mounted on a matching, cooperative support 220. Brush head 202 can be retained to support 220 with any suitable engagement structure, such as a detent arrangement (not shown) or pressure fit, where the inner dimensions of brush head 202 closely match the outer dimensions of support 220. Brush head 202 can be assembled to engage with and be retained on support 220 with light pressure that can be supplied by a user, the same being applied to remove brush head 202 from support 220. Alternatively, or in addition, brush head 202 and support 220 can cooperatively implement a latch structure, which can be actuated to install or remove brush head 202 on support 220. Such a latch structure can be implemented with a protrusion on support 220 and a flexible lever on brush head 202, where the lever releasably engages the protrusion to retain brush head 202 on support 220. Brush head 202 is connected to and supports a normal or standard toothbrush 218. End cap 102 is configured to cover the assembly of brush head 202 on support 220.

An interdental brush head 214 is configured to be mounted in a matching, cooperative support 222. Brush head 214 can be retained to support 222 with any suitable engagement structure, such as a detent arrangement (not shown) or pressure fit, where the outer dimensions of brush head 214 closely match the inner dimensions of support 222. Brush head 214 can be assembled to engage with and be retained on support 222 with light pressure that can be supplied by a user, the same being applied to remove brush head 214 from support 222. Alternatively, or in addition, brush head 214 and support 222 can cooperatively implement a latch structure, which can be actuated to install or remove brush head 214 on support 222. Such a latch structure can be implemented with a protrusion on support 222 and a flexible lever on brush head 214, where the lever releasably engages the protrusion to retain brush head 214 on support 222. Brush head 214 is connected to and supports an interdental brush. End cap 106 is configured to cover the assembly of brush head 214 on support 222. An alternative, spare or replacement interdental brush 216 is provided within end cap 106.

Body case 104 covers an assembly of a motor 206, a component holder 208, batteries 210 and a circuit board 212. Motor 206 is a dual action motor that provides two different vibratory motions at either end. Motor 206 may be implemented as a single motor that provides two different actions, for example, two different speeds, or may be implemented as two separate motors that are actuated separately or independently. The different actions of motor 206 are controlled via circuit board 212, which is actuated by buttons 108, 114. Motor 206 is configured to provide a high frequency vibratory motion at a first end that is coupled to brush head 202. By way of a non-limiting example, the high frequency vibration may be in the range of from about 200 Hz to about 400 Hz. Motor 206 is configured to provide a low frequency vibratory motion at a second end that is coupled to brush head 214. The frequency of vibratory motion provided to brush head 214 may be a fraction of or an order of magnitude less than that provided to brush head 202. For example, the low frequency vibration may be 50% less. Button 108 can be actuated to signal circuit board 212 to operate motor 206 to provide the high frequency vibratory motion to brush head 202. Button 114 can be actuated to signal circuit board 212 to operate motor 206 to provide the low frequency vibratory motion to brush head 214. Motor 206 is a dual function DC motor controlled by circuit board 212 and powered by batteries 210.

Motor 206 may be composed of one motor that can be run at two different speeds, for example, one (higher) speed for brush head 202 and another (lower) speed for brush head 214. In such an example implementation, actuation of button 108 provides a signal to circuit board 212 to operate motor 206 at a higher speed, and engage brush head 202 to vibrate, while brush head 214 is not engaged to vibrate. Actuation of button 114 provides a signal to circuit board 212 to operate motor 206 at a lower speed, and engage brush head 214 to vibrate, while brush head 202 is not engaged to vibrate. In other example implementations, a single selection switch may be used to switch between motor speeds/brush heads, and another switch may be used to connect power to the motor.

Alternately, or in addition, motor 206 may be composed of two separate motors that may be separately and/or independently activated. In such an example implementation, one motor controls and actuates brush head 202, and another motor controls and actuates brush head 214. The separate motors can be controlled with one or more motor controllers, as described in greater detail below.

Each side of motor 206 includes an offset configuration to translate a rotary motion provided by motor 206 to an oscillatory or vibrational motion used to drive supports 220, 222. Supports 220, 222 transfer the oscillatory motion to respective brush heads 202, 214. The offset configuration on each side of motor 206 may include weighting that provides enhanced or amplified oscillations. The offset rotations provided by the offset configuration on each side of motor 206 generate a vibratory motion that can have components that are transverse to a longitudinal axis of toothbrush 100 or motor 206. The vibratory motion can have components that are aligned with the longitudinal axis, and/or transverse and aligned components. The offset of the offset configuration provided to the side of motor 206 that actuates support 220 can be less pronounced than the offset provided to the other side of motor 206 that actuates support 222. This configuration can impart greater amplitude vibrations to brush head 214 compared to the vibrations provided to brush head 202. The difference in vibration amplitude may be balanced to some extent by the difference in vibration frequency applied to be different brush heads, as discussed above. Thus, in some example implementations, brush head 214 is operated at lower frequency with greater amplitude vibrations compared to brush head 202 being operated at higher frequency with less vibrational amplitude.

Circuit board 212 is electrically and/or mechanically coupled to buttons 108, 114, electrically coupled to batteries 210 and electrically coupled to motor 206. Circuit board 212 is electrically and/or mechanically coupled to indicators 110, 112. In an example implementation, circuit board 212 includes electronic components to implement one or more timers, one or more LEDs, and one or more switches, which may have electrical and/or mechanical portions. In such an implementation, the one or more LEDs on circuit board 212 provide visual optical output that registers with, or are implemented as, respective indicators 110, 112. The one or more LEDs may be actuated when respective buttons 108, 114 are actuated. Actuation of buttons 108, 114 can activate a respective timer implemented on circuit board 212. The timer may be the same or different for each of buttons 108, 114, and therefore may implement timing for a same or different interval of time, respectively.

Circuit board 212 provides a controllable connection between batteries 210 and motor 206. Switches implemented on circuit board 212, which may be actuated by associated buttons 108, 114 can be used to connect batteries 210 to one or more portions of motor 206. In an example implementation, batteries 210 are electrically connected to two switches on circuit board 212, one for operating brush head 202 and one for operating brush head 214. Actuation of the respective switches by actuation of associated buttons 108, 114 connects batteries 210 to a respective timer. The timer is activated to supply power from batteries 210 to the portion of motor 206 determined by which button 108, 114 was actuated. Actuating button 108 engages batteries 210 to a timer that supplies power to a portion of motor 206 to supply a vibratory motion to brush head 202. Actuating button 114 engages batteries 210 to a timer that supplies power to a portion of motor 206 to supply a vibratory motion to brush head 214. Expiration of the respective timer resets the switch that connects batteries 210 to the timer, which disconnects an electrical connection between batteries 210 and motor 206.

Circuit board 212 includes electronics to implement one or more DC motor drives. A DC motor drive provides motor control for operating motor 206 with the electric power supplied from batteries 210. In an example implementation, circuit board 212 includes a single DC motor drive that can be operated to control motor 206 in different modes, in accordance with the actuation of buttons 108, 114. For example, actuation of button 108 causes the DC motor drive to be activated with parameters for high frequency operation, while actuation of button 114 causes the DC motor drive to be activated with parameters for low frequency operation. Circuit board 212 may be implemented as a single printed circuit board (PCB) or multiple PCBs, each directed to the specific function of, for example, control, switch operation, LED operation and motor control/drive.

Component holder 208 provides a structure for housing batteries 210, motor 206 and circuit board 212. Component holder 208 may be assembled to have a fixed relationship with body case 104, such as may be implemented with fasteners or adhesives. Body case 104 may completely enclose component holder 208 and the components housed therein. Component holder 208 includes contacts (not shown) for batteries 210 and electrical connections to circuit board 212 and motor 206, which may be in the form of wires that are soldered onto contacts that are respectively contacted by batteries 210, circuit board 212 and motor 206.

A battery cover 204 is configured to tightly fit or snap over an end of body case 104. Battery cover 204 may be retained on body case 104 using detent structures or a pressure fit, such that battery cover 204 may be installed or removed with the application of a threshold level of force. Battery cover 204 may include a latch, pinch points or other mechanisms that retain battery cover 204 on body case 104 and that can be actuated to release battery cover 204 from body case 104. Battery cover 204 may include indicia on an inside surface to illustrate how batteries 210 should be arranged to be properly installed, e.g. for correct polarity. Support 222 is mounted to battery cover 204 with a mounting that permits support 222 to vibrate with respect to battery cover 204. A joint between support 222 and battery cover 204 can be composed of flexible material to permit support 222 to vibrate relative to battery cover 204. The same or similar configuration and relationship is provided between support 220 and body case 104, where support 220 is free to vibrate relative to body case 104.

In operation, toothbrush 100 provides power brushing for a normal, or stepped, toothbrush on one end, and an interdental toothbrush on another end. Toothbrush 218 can be used by removing end cap 102 from body case 104, while maintaining end cap 106 on battery cover 204, which is secured to body case 104, to serve as a handhold for using toothbrush 218. End cap 102 is removed by being pulled with enough force to overcome any retaining mechanism engaging end cap 102 and body case 104, such as a detent mechanism, or is removed by actuating a latch release that permits removal of end cap 102 from body case 104. Button 108 is actuated by being depressed, which actuates a switch on circuit board 212 to connect batteries 210 to a timer that is dedicated to operation of toothbrush 218. The timer may have a time interval in a range of from about one to about eight minutes, for example, and may provide short pauses in a range of from about a tenth of a second to about one second at various times during the time interval. The pauses may be implemented by the timer temporarily interrupting power to motor 206. The pauses can be provided to indicate to the user that they should change the region of teeth that are being brushed, for example, changing between upper teeth to lower teeth, changing to inner, outer, upper or lower surfaces of teeth or changing between left and right sides of the user's mouth. There may be any number of pauses implemented that are practical during the time interval, such as from about one to about eight pauses, which can be set to occur at regular periods during the time interval.

The activated timer connects batteries 210 to motor 206, causing motor 206 to rotate and provide vibrational motion to support 220, causing brush head 202 and toothbrush 218 to vibrate at a frequency determined by circuit board 212, motor 206 and/or the mechanical linkage to support 220. The activated timer also causes an LED on circuit board 212 to illuminate, which provides an optical indication via indicator 110 to show that toothbrush 218 is active. Once the time interval for the timer expires, the switch connecting batteries 210 to the timer is reset, thereby interrupting the electrical path between batteries 210 and motor 206. After use, the user can replace end cap 102 onto body case 104 to enclose toothbrush 218.

Operation of interdental brush head 214 is similar to that described above for toothbrush 218. Brush head 214 can be used by removing end cap 106 from battery cover 204 attached to body case 104, while maintaining end cap 102 on body case 104, which can serve as a handhold for using brush head 214. Similar to end cap 102, end cap 106 is removed by being pulled with enough force to overcome any retaining mechanism engaging end cap 106 and battery cover 204, such as a detent mechanism, or is removed by actuating a latch release that permits removal of end cap 106 from battery cover 204. Button 114 is actuated by being depressed, which actuates a switch on circuit board 212 to connect batteries 210 to a timer that is dedicated to operation of brush head 214. The timer may have a similar configuration to the timer discussed above with regard to time interval, pauses and any other operations implemented by the previously described timer. The same or a different timer may be used, and may be provided with a profile for operation that is determined by which of buttons 108, 114 is pressed. For example, a single timer may be provided for use with the two different brushes, and may be configured with parameters for operation that depend on which of buttons 108, 114 are actuated. The profile provided to the timer may include a time interval that is longer when button 114 is actuated than when button 108 is actuated to cause brush head 214 to be operated. The same profile may not include pauses, while a profile associated with actuation of button 108 may include a set number of pauses. These same profiles may be used to modify operation of the motor for a particular brush in terms of rotations per minute (RPMs), vibrational frequency, power, or any other parameter and that may be controlled by circuit board 212.

The activated timer connects batteries 210 to motor 206, causing motor 206 to rotate and provide vibrational motion to support 222, causing brush head 214 to vibrate at a frequency determined by circuit board 212, motor 206 and/or the mechanical linkage to support 222. The activated timer also causes an LED on circuit board 212 to illuminate, which provides an optical indication via indicator 112 to show that brush head 214 is active. Once the time interval for the timer expires, the switch connecting batteries 210 to the timer is reset, thereby interrupting the electrical path between batteries 210 and motor 206. After use, the user can replace end cap 106 onto battery cover 204 to enclose brush head 214. Brush head 214 can be replaced or exchanged with interdental brush 216 to permit interdental brush 216 to be used in another brushing cycle.

Referring now to FIG. 3, a power toothbrush and case 300 is illustrated in a cross-sectional side view. Toothbrush 100 may be implemented as toothbrush 300 or vice-versa, and features of either toothbrush may be used with the other, individually or in combination with other features. A brush head 304 is configured to be mounted on a matching, cooperative support 308. Brush head 304 can be retained to support 308 with any suitable engagement structure, such as a detent arrangement (not shown) or pressure fit, where the inner dimensions of brush head 304 closely match the outer dimensions of support 308. Brush head 304 can be assembled to engage with and be retained on support 308 with light pressure that can be supplied by a user, the same being applied to remove brush head 304 from support 308. Alternatively, or in addition, brush head 304 and support 308 can cooperatively implement a latch structure, which can be actuated to install or remove brush head 304 on support 308. Such a latch structure can be implemented with a protrusion on support 308 and a flexible lever on brush head 304, where the lever releasably engages the protrusion to retain brush head 304 on support 308. Brush head 304 is connected to and supports a normal or standard toothbrush. An end cap 302 is configured to cover the assembly of brush head 304 on support 308.

An interdental brush head 324 is configured to be mounted in a matching, cooperative support 320. Brush head 324 can be retained to support 320 with any suitable engagement structure, such as a detent arrangement (not shown) or pressure fit, where the outer dimensions of brush head 324 closely match the inner dimensions of support 320. Brush head 324 can be assembled to engage with and be retained on support 320 with light pressure that can be supplied by a user, the same being applied to remove brush head 324 from support 320. Alternatively, or in addition, brush head 324 and support 320 can cooperatively implement a latch structure, which can be actuated to install or remove brush head 324 on support 320. Such a latch structure can be implemented with a protrusion on support 320 and a flexible lever on brush head 324, where the lever releasably engages the protrusion to retain brush head 324 on support 320. Brush head 324 is connected to and supports an interdental brush 328. An end cap 326 is configured to cover the assembly of brush head 324 on support 320. A spare or replacement interdental brush 332 is provided within end cap 326. A mounting structure 320 is provided within end 326 to receive and store spare interdental brush 332. Although illustrated as being similar in construction, interdental brush 324 and spare or replacement interdental brush 332 can have different configurations, and can be utilized for different applications when installed on support 320. For example, interdental brush 324 may be configured for cleaning in between orthodontic devices and interdental brush 332 may be configured for cleaning around dental implants. As can be seen in FIG. 2, brush head 214 has a smaller profile interdental brush, which may be a molded bristle pattern, than does interdental brush 328, which may be formed with a twisted wire and associated bristle pattern. Accordingly, end cap 326 can accommodate several different types of interdental brushes. Likewise, in an example implementation, end cap 302 can accommodate several types of normal or stepped toothbrushes, similarly to the configuration of end cap 326.

Body case 346 covers an assembly of a motor 314, a component holder 348, batteries 334 and a circuit board 344. Motor 314 is a dual action motor that provides two different vibratory motions via shafts 312, 316. The different actions of motor 314 are controlled via circuit board 344, which is actuated by buttons 342, 336. Buttons 342, 336 may be integrated with or separate from indicators 340, 338, as discussed below. In some example implementations, a single indicator, such as a single LED, is provided to show when brush heads 304, 324 are actuated. Motor 314 is configured to provide a high frequency vibratory motion via shaft 312 at a first end that is coupled to brush head 304. Motor 314 is configured to provide a low frequency vibratory motion via shaft 316 at a second end that is coupled to brush head 324. The frequency of vibratory motion provided to brush head 324 may be a fraction of or an order of magnitude less than that provided to brush head 304. Button 342 can be actuated to signal circuit board 344 to operate motor 314 to provide the high frequency vibratory motion to brush head 304 via shaft 312. Button 336 can be actuated to signal circuit board 344 to operate motor 314 to provide the low frequency vibratory motion to brush head 324 via shaft 316. Motor 314 is a dual function DC motor controlled by circuit board 344 and powered by batteries 334.

Each side of motor 314 includes offset configuration 310, 318 to translate a rotary motion provided by respective shafts 312, 316 of motor 314 to an oscillatory or vibrational motion used to drive supports 308, 320. Supports 308, 320 transfer the oscillatory motion to respective brush heads 304, 324 via respective offset configurations 310, 318. Offset configurations 310, 318 on each respective side of motor 314 may include weighting that provides enhanced or amplified oscillations. The offset rotations provided by offset configurations 310, 318 on each respective side of motor 314 generate a vibratory motion that can have components that are transverse to a longitudinal axis of toothbrush 300 or motor 314. The vibratory motion can have components that are aligned with the longitudinal axis, and/or components that are transverse to and aligned with the longitudinal axis. One or more of shafts 312, 316 may be coupled to a cam and have a rotational cycle that moves one or more of shafts 312, 316 away from and towards motor 314 to provide vibratory oscillations in a direction of the longitudinal axis of toothbrush 300. The offset of offset configuration 310 provided to shaft 312 on the side of motor 314 that actuates support 308 can be less pronounced than that of offset configuration 318 provided to shaft 316 on the other side of motor 314 that actuates support 320. This configuration can impart greater amplitude vibrations to brush head 324 compared to the vibrations provided to brush head 304. The difference in vibration amplitude may be balanced to some extent by the difference in vibration frequency applied to be different brush heads, as discussed above. Thus, in some example implementations, brush head 324 is operated at lower frequency with greater amplitude vibrations compared to brush head 304 being operated at higher frequency with less vibrational amplitude. In some examples, offset configurations 310, 318 are implemented as an eccentric or off center weight that is attached to shafts 312, 316, respectively. As the respective motor shaft 312, 316 rotates, the eccentric weight causes a lateral vibration for the respective support 308, 320. In some example implementations, supports 308, 320 are caused to oscillate in a regular pattern, as might be effectuated with a piston/crankshaft/cam configuration to describe a curve path such as a circular or oval path for brush heads 304, 324.

Circuit board 344 is electrically and/or mechanically coupled to buttons 342, 336, electrically coupled to batteries 334 and electrically coupled to motor 314. Circuit board 344 is electrically and/or mechanically coupled to indicators 340, 338. In an example implementation, circuit board 344 includes electronic components to implement one or more timers, one or more LEDs, and one or more switches, which may have electrical and/or mechanical portions. In such an implementation, the one or more LEDs on circuit board 344 provide visual optical output that registers with respective indicators 340, 338. The one or more LEDs may be actuated when respective buttons 342, 336 are actuated. For example, buttons 342, 336 may be integrated with indicators 340, 338, such that actuation of a button 342, 336 causes a respective LED to illuminate a respective indicator 340, 338. In some implementations, buttons 342, 336 may be implemented as LEDs, which also serve as indicators 340, 338, so that the LEDs have mechanical, electrical and optical responses. Such configurations as those discussed herein permit the appearance of an indicator 340, 338 illuminating upon being pressed. Actuation of buttons 342, 336 can activate a respective timer implemented on circuit board 344. The timer may be the same or different for each of buttons 342, 336, and therefore may implement timing for a same or different interval of time, respectively.

Circuit board 344 provides a controllable connection between batteries 334 and motor 314. Switches implemented on circuit board 344, which may be actuated by associated buttons 342, 336, can be used to connect batteries 334 to one or more portions of motor 314. In an example implementation, batteries 334 are electrically connected via contacts 350, 352 to two switches on circuit board 344, one for operating brush head 304 and one for operating brush head 324. Actuation of the respective switches by actuation of associated buttons 342, 336 connects batteries 334 to a respective timer. The timer is activated to supply power from batteries 334 to the portion of motor 314 determined by which button 342, 336 was actuated. Actuating button 342 engages batteries 334 to a timer that supplies power to a portion of motor 314 to engage and operate shaft 312 to supply a vibratory motion to brush head 304. Actuating button 336 engages batteries 334 to a timer that supplies power to a portion of motor 314 to engage and operate shaft 316 to supply a vibratory motion to brush head 324. Expiration of the respective timer resets the switch that connects batteries 334 to the timer, which disconnects an electrical connection between batteries 334 and motor 314.

Component holder 348 provides a structure for housing batteries 334, motor 314 and circuit board 344. Component holder 348 may be assembled to have a fixed relationship with body case 346, such as may be implemented with fasteners or adhesives. Body case 346 may completely enclose component holder 348 and the components housed therein. Component holder 348 includes contacts 350, 352 for batteries 334 and electrical connections for interfacing with circuit board 344 and motor 314, which may be in the form of wires that are soldered onto contacts that are respectively contacted by circuit board 344 and motor 314.

A battery cover (not shown) can be provided to really simply enclose batteries 334. The battery cover may be hinged and retained on body case 346 using detent structures or a pressure fit, such that the battery cover may be opened or closed with the application of a threshold level of force. The battery cover may include a latch, pinch points or other mechanisms that retain the battery cover on body case 346 and that can be actuated to release the battery cover from body case 346. The battery cover may include indicia on an inside surface to illustrate how batteries 334 should be arranged to be properly installed, e.g. for correct polarity.

In operation, toothbrush 300 provides power brushing for a normal, or stepped, toothbrush on one end, and an interdental toothbrush on another end. Toothbrush 304 can be used by removing end cap 302 from body case 346, while maintaining end cap 326 on body case 346, to serve as a handhold for using toothbrush 304. End cap 302 is removed by being pulled with enough force to overcome any retaining mechanism engaging end cap 302 and body case 346, such as a detent mechanism, or is removed by actuating a latch release that permits removal of end cap 302 from body case 346. Button 342 is actuated by being depressed, which actuates a switch on circuit board 344 to connect batteries 334 to a timer that is dedicated to operation of toothbrush 304. The timer may have a time interval in a range of from about one to about eight minutes, for example, and may provide short pauses in a range of from about a tenth of a second to about one second at various times during the time interval. The pauses may be implemented by the timer temporarily interrupting power to motor 314. The pauses can be provided to indicate to the user that they should change the region of teeth that are being brushed, for example, changing between upper teeth to lower teeth, changing to inner, outer, upper or lower surfaces of teeth or changing between left and right sides of the user's mouth. There may be any number of pauses implemented that are practical during the time interval, such as from about one to about eight pauses, which can be set to occur at regular periods during the time interval.

The activated timer connects batteries 334 to motor 314, causing motor 314 to rotate and provide vibrational motion to support 308, causing toothbrush 304 to vibrate at a frequency determined by circuit board 344, motor 314 and/or the mechanical linkage to support 308, such as offset configuration 310. The activated timer also causes an LED on circuit board 334 to illuminate, which provides an optical indication via indicator 340 to show that toothbrush 304 is active. Once the time interval for the timer expires, the switch connecting batteries 334 to the timer is reset, thereby interrupting the electrical path between batteries 334 and motor 314. After use, the user can replace end cap 302 onto body case 346 to enclose toothbrush 304.

Operation of interdental brush head 324 is similar to that described above for toothbrush 304. Brush head 324 can be used by removing end cap 326 from body case 346, while maintaining end cap 302 on body case 346, which can serve as a handhold for using brush head 324. Similar to end cap 302, end cap 326 is removed by being pulled with enough force to overcome any retaining mechanism engaging end cap through 26 and body case 346, such as a detent mechanism, or is removed by actuating a latch release that permits removal of end cap 326 from body case 346. Button 336 is actuated by being depressed, which actuates a switch on circuit board 344 to connect batteries 334 to a timer that is dedicated to operation of brush head 324. The timer may have a similar configuration to the timer discussed above with regard to time interval, pauses and any other operations implemented by the previously described timer. The same or a different timer may be used, and may be provided with a profile for operation that is determined by which of buttons 342, 336 is pressed. For example, a single timer may be provided for use with the two different brushes, and may be configured with parameters for operation that depend on which of buttons 342, 336 are actuated. The profile provided to the timer may include a time interval that is longer when button 336 is actuated than when button 342 is actuated to cause brush head 324 to be operated. The same profile may not include pauses, while a profile associated with actuation of button 342 may include a set number of pauses. These same profiles may be used to modify operation of the motor for a particular brush in terms of rotations per minute (RPMs), vibrational frequency, power, or any other parameter and that may be controlled by circuit board 344.

The activated timer connects batteries 334 to motor 314, causing motor 314 to rotate and provide vibrational motion to support 320, causing brush head 324 to vibrate at a frequency determined by circuit board 344, motor 314 and/or the mechanical linkage to support 320, such as offset configuration 318. The activated timer also causes an LED on circuit board 344 to illuminate, which provides an optical indication via indicator 338 to show that brush head 324 is active. Once the time interval for the timer expires, the switch connecting batteries 334 to the timer is reset, thereby interrupting the electrical path between batteries 334 and motor 314. After use, the user can replace end cap 326 onto body case 346 to enclose brush head 324. Brush head 324 can be replaced or exchanged with interdental brush 332 to permit interdental brush 332 to be used in another brushing cycle.

Other additional or alternative implementations may be obtained based on variations to the above described examples. For example, the batteries may be omitted, and a provision for the motor to be powered via utility power from an electrical wall socket can be implemented. The circuit board can provide any desired conversion between utility (AC) power and the power format used by the motor. The batteries may also be rechargeable, with an external power source connected to the circuit board to cause a suitable power format to be provided to the batteries in a recharging operation. The motor may be operated with electric power or may be fluid operated, such as in the case of a pneumatic motor. In such an instance, buttons discussed herein may actuate valves that cause actuation of the motor and the respective brushes. In addition, or alternatively, the toothbrush may be used for other applications that do not involve dental cleaning, such as household and/or industrial cleaning, buffing or polishing applications. Various brushes may be provided that are designed for more robust cleaning applications than would be used for dental cleaning applications, such as brushes composed of stiffer or harder materials, including metals or alloys or high strength plastics. For example, brushes and implementations may be provided for cleaning kitchen or bathroom fixtures, tile, grout, and other materials that are suitable for cleaning or polishing with a vibratory brush. The button or control configuration of the toothbrush may also be varied, for example a slide switch may be provided as one of the buttons that selects between the toothbrush and the interdental brush, and a power switch may be provided as another button that powers the brush selected with the slide switch. The circuit board or motor may provide a lockout mechanism for the toothbrush and the interdental brush, such that the first end does not operate when the second end operates, and vice-versa.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

What is claimed is:

1. A power brush comprising:
    a body with a first end and a second end distal from the first end;
    a motor housed in the body and coupled to a power source for actuating the motor;
    a circuit board actuated by one or more buttons housed in the body for controlling different actions of the motor;
    the motor is a dual action motor that provides two different vibratory motions via two shafts with a first shaft and a second shaft distal from the first end extending from the motor;
    the first shaft extending from one end of the motor;
    a first brush head coupled to the first shaft;
    the second shaft extending from the opposing end of the motor from the first shaft;
    a second brush head coupled to the second shaft;
    each side of the motor includes an offset configuration to translate a rotary motion provided by the respective shafts of the motor to an oscillatory or vibrational motion used to drive supports;
    supports transfer the oscillatory motion to respective brush heads via respective offset configurations;
    offset configurations on each respective side of motor include weighting that provides enhanced or amplified oscillations;
    the first brush and the second brush being coupled to the motor by the first and second shafts and being configured to separately vibrate based on selective actuation of the motor.

2. The power brush of claim 1, wherein the motor comprises a dual-action motor capable of different frequency and speeds, with separate actions for the first brush and for the second brush.

3. The power brush of claim 1, wherein the motor comprises a first motor and a second motor,
    the first and second motors each capable of multiple individual speeds,
    the first motor disposed adjacent to the first end of the body and being coupled to the first brush; and
    the second motor disposed adjacent to the second end of the body and being coupled to the second brush.

4. The power brush of claim 1, wherein the first brush comprises a toothbrush and the second brush comprises an interdental tool.

5. The power brush of claim 1, further comprising
    the first brush being configured to vibrate at a first frequency;
    the second brush being configured to vibrate at a second frequency that is different from the first frequency; and
    a two-minute timer providing notification that an acceptable brushing period has been reached.

6. The power brush of claim 5, further comprising one or more operation profiles being provided to the circuit board that can be selectively applied for operation of the first brush and the second brush with different parameters.

7. A power toothbrush, comprising:
    a body with a first end and a second end distal from the first end;
    an electric motor coupled to an electric power source for actuating the motor;
    the motor is a dual action motor that provides two different vibratory motions via two shafts with a first shaft and a second shaft distal from the first end extending from the motor;
    the first shaft extending from one end of the motor;
    a first brush coupled to the first shaft;
    the second shaft extending from the opposing end of the motor from the first shaft;
    a second brush coupled to the second shaft;
    each side of the motor includes an offset configuration to translate a rotary motion provided by the respective shafts of the motor to an oscillatory or vibrational motion used to drive supports;
    supports transfer the oscillatory motion to respective brush heads via respective offset configurations;
    offset configurations on each respective side of motor include weighting that provides enhanced or amplified oscillations;
    the first brush and the second brush being coupled to the motor by the first and second shafts and being configured to separately vibrate based on selective actuation of the motor; and
    a circuit board and control circuit actuated by one or more buttons housed in the body for controlling different actions of the motor;
    the control circuit interposed between the power source and the motor for selectively actuating the first brush or the second brush by selectively connecting power to the motor.

8. The power toothbrush of claim 7, wherein the motor comprises a dual-action motor, with separate speeds for the first brush and for the second brush.

9. The power toothbrush of claim 7, wherein the motor comprises a first motor and a second motor, the first motor disposed adjacent to the first end of the body and being coupled to the first brush and the second motor disposed adjacent to the second end of the body and being coupled to the second brush.

10. The power toothbrush of claim 9, wherein the first motor is configured for driving the first brush and the second motor is configured for driving the second brush, the first motor and second motor being configured to operate independently from each other such that the first motor may operate when the second motor operates.

11. The power toothbrush of claim 7, further comprising a switch coupled to the motor and to the control circuit and being configured to separately operate the first brush and the second brush, such that the first brush does not operate when the second brush operates, and vice-versa.

12. The power toothbrush of claim 7, wherein the first brush comprises a toothbrush and the second brush comprises an interdental brush, the first brush being configured to vibrate at a first frequency and the second brush being configured to vibrate at a second frequency that is different from the first frequency.

13. The power toothbrush of claim 7, further comprising a button coupled to the circuit board for actuating the first brush or the second brush and an indicator representing actuation of the first brush or the second brush.

14. The power toothbrush of claim 7, further comprising one or more of the circuit board, motor, or a link between the motor and the first brush or the second brush being configured to cause the first brush to vibrate at a first frequency when actuated and to cause the second brush to vibrate at a second frequency that is different from the first frequency when actuated.

15. The power toothbrush of claim 7, further comprising one or more operation profiles being provided to the circuit board that can be selectively applied for operation of the first brush and the second brush with different parameters.

* * * * *